United States Patent [19]

Mitsui et al.

[11] Patent Number: 5,430,230
[45] Date of Patent: Jul. 4, 1995

[54] METHOD FOR DISPOSING OF ORGANOHALOGEN COMPOUNDS BY OXIDATIVE DECOMPOSITION

[75] Inventors: Kiichiro Mitsui, Akashi; Toru Ishii, Ibo; Kazuyoshi Nishikawa, Himeji, all of Japan

[73] Assignee: Nippon Shokubai Co., Ltd., Osaka, Japan

[21] Appl. No.: 962,590

[22] PCT Filed: Apr. 27, 1992

[86] PCT No.: PCT/JP92/00552
§ 371 Date: Dec. 29, 1992
§ 102(e) Date: Dec. 29, 1992

[87] PCT Pub. No.: WO92/19366
PCT Pub. Date: Nov. 12, 1992

[30] Foreign Application Priority Data

Apr. 30, 1991 [JP] Japan ................. 3-128464

[51] Int. Cl.⁶ ........................... A62D 3/00
[52] U.S. Cl. ................. 588/206; 423/240 S; 423/245.3; 423/247
[58] Field of Search ........... 423/240 S, 239, 245.3, 423/247; 588/206, 213, 226, 228

[56] References Cited

U.S. PATENT DOCUMENTS 4,957,717  9/1990  Imamura et al. ............. 423/240 R

FOREIGN PATENT DOCUMENTS 51-22699    2/1976   Japan .
53-12768    2/1978   Japan .
55-155740  12/1980   Japan .
57-30532    6/1982   Japan .
59-39329    3/1984   Japan ................. 423/240 S
60-220148  11/1985   Japan .
1-14807     3/1989   Japan .
2-280816   11/1990   Japan .
3-8413      1/1991   Japan ................. 423/240 S
3-12221     1/1991   Japan ................. 423/240 S
3-47516     2/1991   Japan .
3-106419    5/1991   Japan .
3-249920   11/1991   Japan ................. 423/240 S
3-289973   12/1991   Japan .
4-118027    4/1992   Japan .
90/13352   11/1990   WIPO .
91/04780    4/1991   WIPO .

*Primary Examiner*—Gary P. Straub
*Attorney, Agent, or Firm*—Oblon, Spivak, McClelland, Maier, & Neustadt

[57] ABSTRACT

Disclosed herein is a method for disposing of organohalogen compounds by oxidative decomposition to make them harmless, without secondarily forming carbon monoxide and halogen gas, said method comprising catalytically reacting waste gas at a temperature between 150°–600° C. with a catalyst containing as catalyst component A a composite oxide of two or more metals selected from the group consisting of Si, Ti, and Zr, and as catalyst component B an oxide of one or more metals selected from the group consisting of V, Mo, Sn, Ce, and W. According to a preferred embodiment, the catalyst may additionally contain as catalyst component C, in the form of simple substance or oxide, one or more metals selected from the group consisting of Cr, Mn, Fe, Cu, Ru, Rh, Pd, Pt, and Au.

3 Claims, No Drawings

METHOD FOR DISPOSING OF ORGANOHALOGEN COMPOUNDS BY OXIDATIVE DECOMPOSITION

TECHNICAL FIELD

The present invention relates to a method for disposing by oxidative decomposition of organohalogen compounds contained in waste gas coming from incinerators, cleaning, and many other processes. More particularly, the present invention relates to a method for disposing by oxidative decomposition of organohalogen compounds while preventing the formation of carbon monoxide by oxidative decomposition and removing organohalogen compounds together with nitrogen oxides and carbon monoxide contained in waste gas.

BACKGROUND ART

There are several known methods for disposing of harmful organohalogen compounds contained in waste gas. One method is by direct heating of waste gas at temperatures above 800° C. Another method is by adsorption on an adsorbent such as activated carbon. The former method requires a large amount of fuel and evolves toxic halogens and carbon monoxide during decomposition under certain operating conditions. The latter method suffers the disadvantage that the adsorption efficiency fluctuates depending on the concentration of substances for disposal and the adsorption is inhibited by coexistent substances.

There has been proposed a method for oxidative decomposition by the aid of a transition metal oxide as a catalyst. (Japanese Patent Laid-open Nos. 22699/1976 and 47516/1991.) This method permits oxidative decomposition at comparatively low temperatures; however, it still suffers the disadvantage that oxidation is not complete and toxic carbon monoxide remains in the treated gas.

The present invention was completed to address the above-mentioned problems. It is an object of the present invention to provide a method for efficiently disposing of organohalogen compounds together with nitrogen oxides and carbon monoxide contained in waste gas by oxidative decomposition at low temperatures without the formation of toxic chlorine gas.

DISCLOSURE OF THE INVENTION

The gist of the present invention resides in a method for disposing of organohalogen compounds by oxidative decomposition, said method comprising catalytically reacting waste gas at a temperature between 150°-600° C. with a catalyst containing as catalyst component A a composite oxide of two or more metals selected from the group consisting of Si, Ti, and Zr, and as catalyst component B an oxide of one or more metals selected from the group consisting of V, Mo, Sn, Ce, and W.

According to the present invention, the catalyst may additionally contain as catalyst component C, in the form of simple substance or oxide, one or more metals selected from the group consisting of Cr, Mn, Fe, Cu, Ru, Rh, Pd, Pt, and Au. The additional catalyst component C prevents the formation of carbon monoxide. Moreover, if ammonia is added to waste gas, it is possible to remove nitrogen oxides simultaneously with oxidative decomposition of organohalogen compounds and carbon monoxide contained in waste gas.

BEST MODE FOR CARRYING OUT THE INVENTION

The present inventors found that it is possible to perform efficient oxidative decomposition on organohalogen compounds at low temperatures (150°-600° C.) by the use of catalyst component A, which is a composite oxide of two or more metals selected from the group consisting of Si, Ti, and Zr, and catalyst component B, which is an oxide of one or more metals selected from the group consisting of V, Mo, Sn, Ce, and W. The present inventors also found that it is possible to minimize the formation of carbon monoxide by the combined use of one or more metals, in the form of simple substance or oxide, selected from the group consisting of Cr, Mn, Fe, Cu, Ru, Rh, Pd, Pt, and Au. These findings led to the present invention.

In addition, the method of the present invention permits the oxidative decomposition of organohalogen compounds and carbon monoxide as well as the removal of nitrogen oxides if ammonia gas is added to waste gas.

The present invention will be described in more detail in the following.

The organohalogen compounds referred to in the present invention are defined as any organic compound having at least one halogen atom in the molecule. They include aliphatic organochlorine compounds (such as methyl chloride, ethyl chloride, dichloroethylene, and vinyl chloride), aliphatic organobromine compounds (such as methyl chloride, methylene chloride, ethylene bromide, and vinyl bromide), aromatic organochlorine compounds (such as monochlorobenzene and dichlorobenzene), aromatic organobromine compounds (such as benzyl bromide and benzylidene bromide), toxic organochlorine compounds (such as polydibenzodioxin chloride and polybenzofuran chloride), and flon gas (such as trichlorofluoromethane and dichlorodifluoromethane).

The method of the present invention may also be used to dispose of waste gas coming from uncatalyzed combustion of solid organochlorine compounds such as PCB and 2,4,5-trichlorophenoxyacetic acid.

The oxidative decomposition according to the present invention may be accomplished by the use of air or oxygen-enriched air so long as it contains sufficient oxygen to oxidize organohalogen compounds, thereby converting carbon therein into $CO_2$ and converting halogens into HCl, HBr, HF, and the like.

The catalyst component A used in the present invention should be a composite oxide of at least two or more metals selected from the group consisting of Si, Ti, and Zr. Examples of the composite oxide include binary ones (such as titanium-silicon oxide and titanium-zirconium oxide) and ternary ones (such as titanium-silicon-zirconium oxide).

These binary and ternary composite oxides have a larger surface area than the unitary oxide; therefore, they are highly active and effectively disperse the catalyst components B and C for oxidative decomposition. In addition, they are immune to acidic gases such as HCl and $SO_x$ contained in waste gas for disposal and hence remain active for a long period of time.

The catalyst used in the present invention should preferably be composed of 70–95 wt % of catalyst component A (as oxide), 0.1–20 wt % of catalyst component B, and 0.01–25 wt % of catalyst component C. Catalyst component B in excess of 20 wt % will lower the strength of the catalyst and shortens the catalyst life. Catalyst component B less than 0.1 wt % is not enough for complete decomposition of organohalogen compounds. Therefore, the preferred amount of catalyst component B ranges from 0.1 to 20 wt %. Catalyst component C in excess of 25 wt % will raise the catalyst cost. Catalyst component C less than 0.01 wt % will permit the formation of carbon dioxide. Therefore, the preferred amount of catalyst component C ranges from 0.01 to 25 wt %. The catalytic decomposition evolves HCl, HF, HBr, etc., which can be easily removed by any known method such as alkali washing.

The following is the typical process for preparing the catalyst used in the present invention.

First, a composite oxide of titanium-silicon, titanium-zirconium, or titanium-silicon-zirconium is mixed with an aqueous solution containing catalyst component B (such as V and W) or oxide powder, molding auxiliary, and an adequate amount of water, and the mixture is molded into a honeycomb by extrusion. The molding is dried at 50°–120° C. and then calcined at 400°–600° C., preferably 430°–550° C., for 1–10 hours, preferably 2–6 hours, in an air stream.

Catalyst component C is supported on the thus obtained molding. Catalyst component C is a noble metal such as Ru, Rh, Pd, Pt, and Au, or a metal such as Cr, Mn, Fe, and Cu in the form of simple substance or oxide. In this way there is obtained the desired catalyst. The catalyst component C is selected from metals belonging to Group VIII of the periodic table, of which Ru, Rh, Pd, and Pr are preferable and Au is most desirable.

The method for causing the molding to support catalyst component C is by dipping the molding in an aqueous solution of catalyst component C at room temperature for 1–5 minutes, followed by drying at 30°–200° C., preferably 70°–170° C., and calcining in air at 300°–700° C., preferably 400°–600° C.

The catalyst may take any other forms than honeycomb. For example, it may be in the form of column, cylinder, plate, ribbon, corrugated board, pipe, toroid, grating, or the like. The catalyst may also be prepared by coating a carrier (molded from cordierite or mullite) with a slurry of catalyst components A and B and then impregnating the coated carrier with catalyst C.

Metals used in the preparation of the catalyst of the present invention may be obtained from the following raw materials.

Silicon may be obtained from colloidal silica, water glass, silicon tetrachloride, and ethyl silicate. Titanium may be obtained from inorganic titanium compounds (such as titanium chloride, titanium hydroxide, and titanium sulfate) and organic titanium compounds (such as titanium oxalate and tetraisopropyl titanate). Zirconium may be obtained from inorganic zirconium compounds (such as zirconium chloride, zirconium oxychloride, and zirconium nitrate) and organic zirconium compounds (such as zirconium oxalate and tetraisopropyl zirconate).

The starting material for catalyst component B may be in the form of oxide, hydroxide, inorganic salt, or organic salt, which include ammonium salts, oxalates, sulfates, and halides. The starting material for catalyst component C may be in the form of chloride, nitrate, organic salt, chloro-noble metal-acid, or copper compound.

The oxidative decomposition according to the present invention may be accomplished in any reactor, such as fixed-bed reactor, moving-bed reactor, and fluidized-bed reactor. In the case where the method of the present invention is used to dispose of organohalogen compounds contained in waste gas coming from incinerators, it is desirable to use the catalyst in honeycomb form so that the opening can be adjusted according to the amount of dust to prevent the catalyst layer from being clogged.

The reaction temperature should be in the range of 150°–600° C. Reactions below 150° C. do not permit efficient decomposition; and reaction above 600° C. needs more fuel.

EXAMPLES

Example 1

A composite oxide of titanium and silicon was prepared in the following manner. First, a titanium source (in the form of aqueous solution) was prepared from titanyl sulfate and sulfuric acid in a ratio given below.

TiOSO$_4$ (as TiO$_2$) . . . 250 g/L

Total H$_2$SO$_4$ . . . 1100 g/L

This aqueous solution (153 liters) was diluted with 300 liters of water. The diluted titanium-containing solution was slowly added dropwise with stirring to an ammonium solution for gel coprecipitation. The ammonium solution was prepared by adding to 400 liters of water 286 liters of ammonia water (25% NH$_3$) and 24 kg of Snowtex NCS-30 (silica sol containing about 30 wt % SiO$_2$, made by Nissan Chemical Industries, Ltd.). After standing for 15 hours, the gel precipitates (of titanium-silicon composite oxide) were filtered off, washed with water, and dried at 200° C. for 10 hours.

The dried precipitates were calcined in air at 550° C. for 6 hours. The resulting powder was found to have a composition of Ti: Si=4: 1 (atomic ratio) and a BET specific surface area of 185 m$^2$/g. This powder is designated as TS-1 herein after. TS-1 was made into a molding in the following manner.

To a mixture of ethanolamine (0.7 liter) and water (7 liters) were added in succession 1.03 kg of ammonium paratungstate and 1.14 kg of ammonium metavanadate to give a homogeneous solution. This solution was thoroughly mixed with 16 kg of TS-1 and an adequate amount of water using a kneader. The resulting mixture was extrusion-molded into a honeycomb shaped molding, measuring 80 mm square and 350 mm long, with an opening of 3.0 mm and a wall thickness of 0.7 mm. The honeycomb shaped molding was dried at 60° C. and then calcined in an air stream at 450° C. for 5 hours. Thus there was obtained a catalyst composed of TS-1: V$_2$O$_5$: WO$_3$=90: 5:5 (by weight). The catalyst was cut into small pieces, each measuring 23 mm square (6×6 cells) and 300 mm long. They were charged into the reactor, through which a synthetic gas of the following composition was passed under the specified conditions.

1-1. Decomposition of 1,1,2,2-tetrachloroethane

Space velocity: 2000 h$^{-1}$ Gas concentration: 300 ppm/air balance Temperatures: 250°, 300°, 350° C.

1-2. Decomposition of dichlorobenzene Space velocity: 2000 h$^{-1}$ Gas concentration: 300 ppm/air balance Temperatures: 200°, 250°, 300°, 350° C.

1-3. Decomposition of flon 113

Space velocity: 2000 h$^{-1}$ Gas concentration: 300 ppm/air balance Temperatures: 300°, 350°, 400° C.

The results of the experiment are shown in Table 1. In all the cases, no chlorine gas was detected in the decomposed gas.

TABLE 1

| Ex-ample No. | Object for disposal | Decomposition efficiency and CO formation (%) | | | | | | | | | |
|---|---|---|---|---|---|---|---|---|---|---|---|
| | | 200° C. | | 250° C. | | 300° C. | | 350° C. | | 400° C. | |
| | | Decomp. effi'cy | CO formation | Decomp. effi'cy | CO formation | Decomp. effi'cy | CO formation | Decomp. effi'cy | CO formation | Decomp. effi'cy | CO formation |
| 1-1 | Tetrachloroethane | — | — | 85 | 20 | >99.5 | 32 | >99.5 | 61 | >99.5 | 74 |
| 1-2 | Dichlorobenzene | 90.3 | 2 | 99.2 | 20 | >99.8 | 20 | >99.8 | 20 | — | — |
| 1-3 | Flon 113 | — | — | — | — | 50.5 | 12 | 75.0 | 13 | 95.0 | 14 |

Example 2

Using TS-1 powder obtained in Example 1, a molding composed of TS-1: $V_2O_5$: $WO_3$=90: 5:5 was prepared in the same manner as in Example 1. This molding was dipped in 3.0 liters of aqueous solution of platinum chloride (containing 22.1 g of Pt) for 1 minute. Then the molding was dried at 100° C. and calcined in an air stream at 450° C. for 5 hours. The thus obtained catalyst was found to support Pt in an amount of 0.25 wt %.

The catalyst was cut into small pieces, each measuring 23 mm square (6×6 cells) and 300 mm long. They were charged into the reactor, through which 1, 1,2,2-tetrachloroethane, dichlorobenzene, and flon 113 were passed for decomposition under the same conditions as in Example 1. The results are shown in Table 2. In all the cases, no chlorine gas was detected in the decomposed gas.

was prepared in the same manner as in Example-1. This molding is in the form of honeycomb shaped molding, measuring 80 mm square and 350 mm long, with an opening of 3.0 mm and a wall thickness of 0.7 mm. The molding was dipped in 3.0 liters of aqueous solution containing 170 g of chromium nitrate [$Cr(NO_3)_3.9H_2O$] for 1 minute. Then the molding was dried at 100° C. and calcined in an air stream at 500° C. for 2 hours. The thus obtained catalyst was found to support $Cr_2O_3$ in an amount of 0.38 wt %.

The catalyst was cut into small pieces, each measuring 23 mm square (6×6 cells) and 300 mm long. They were charged into the reactor, through which dichlorobenzene was passed for decomposition under the same conditions as in Example 1. The results are shown in Table 4. In all the cases, no chlorine gas was detected in the decomposed gas.

TABLE 2

| Ex-ample No. | Object for disposal | Decomposition efficiency and CO formation (%) | | | | | | | | | |
|---|---|---|---|---|---|---|---|---|---|---|---|
| | | 200° C. | | 250° C. | | 300° C. | | 350° C. | | 400° C. | |
| | | Decomp. effi'cy | CO formation | Decomp. effi'cy | CO formation | Decomp. effi'cy | CO formation | Decomp. effi'cy | CO formation | Decomp. effi'cy | CO formation |
| 2-1 | Tetrachloroethane | 40.0 | 0 | 70.0 | 0 | >99.5 | 0 | >99.5 | 0 | — | — |
| 2-2 | Dichlorobenzene | 98.0 | 0 | 99.5 | 0 | >99.8 | 0 | >99.8 | 0 | — | — |
| 2-3 | Flon 113 | — | — | — | — | 72.0 | 0 | 85.0 | 0 | 97.5 | 0 |

Example 3

Using TS-1 powder obtained in Example 1, a molding composed of TS-1: $V_2O_5$: $WO_3$=90: 5:5 was prepared in the same manner as in Example 1. This molding was dipped in 3.0 liters of aqueous solution of palladium nitrate (containing 11.0 g of Pd) for 1 minute. Then the molding was dried at 100° C., and calcined in an air stream at 500° C. for 2 hours. The thus obtained catalyst was found to carry Pd in an amount of 0.1 wt %.

The catalyst was cut into small pieces, each measuring 23 mm square (6×6 cells) and 300 mm long. They were charged into the reactor, through which 1,1,2,2-tetrachloroethane, dichlorobenzene, and flon 113 were passed for decomposition under the same conditions as in Example 1. The results are shown in Table 3. In all the cases, no chlorine gas was detected in the decomposed gas.

Example 5

A molding of the same size and composition as that in Example 4 was prepared. The molding was dipped in 3.0 liters of aqueous solution containing 1370 g of manganese nitrate [$Mn(NO_3)_2.6H_2O$] for 1 minute. Then the molding was dried at 100° C. and calcined in an air stream at 500° C. for 2 hours. The thus obtained catalyst was found to carry $MnO_2$ in an amount of 5 wt %.

The catalyst was used for decomposition of dichlorobenzene in the same manner as in Example 4. The results are shown in Table 4. In all the cases, no chlorine gas was detected in the decomposed gas.

Example 6

A molding of the same size and composition as that in Example 4 was prepared. The molding was dipped in 3.0 liters of aqueous solution containing 1270 g of copper nitrate [$Cu(NO_3)_2.3H_2O$] for 1 minute. Then the

TABLE 3

| Ex-ample No. | Object for disposal | Decomposition efficiency and CO formation (%) | | | | | | | | | |
|---|---|---|---|---|---|---|---|---|---|---|---|
| | | 200° C. | | 250° C. | | 300° C. | | 350° C. | | 400° C. | |
| | | Decomp. effi'cy | CO formation | Decomp. effi'cy | CO formation | Decomp. effi'cy | CO formation | Decomp. effi'cy | CO formation | Decomp. effi'cy | CO formation |
| 3-1 | Tetrachloroethane | 50.0 | 0 | 85.0 | 0 | >99.5 | 0 | >99.5 | 0 | — | — |
| 3-2 | Dichlorobenzene | 99.0 | 0 | >99.8 | 0 | >99.8 | 0 | >99.8 | 0 | — | — |
| 3-3 | Flon 113 | — | — | — | — | >5.0 | 0 | 88.0 | 0 | 98.5 | 0 |

Example 4

Using TS-1 powder obtained in Example 1, a molding composed of TS-1: $V_2O_5$: $WO_3$=87: 8:5 (by weight)

molding was dried at 120° C. and calcined in an air stream at 500° C. for 2 hours. The thus obtained catalyst was found to support CuO in an amount of 5 wt %.

The catalyst was used for decomposition of dichlorobenzene in the same manner as in Example 4. The results are shown in Table 4. In all the cases, no chlorine gas was detected in the decomposed gas.

TABLE 4

| | | Decomposition efficiency and CO formation (%) | | | | | | | |
|---|---|---|---|---|---|---|---|---|---|
| | | 200° C. | | 250° C. | | 300° C. | | 350° C. | |
| Example No. | Catalyst composition | Decomp. effi'cy | CO formation | Decomp. effi'cy | CO formation | Decomp. effi'cy | CO formation | Decomp. effi'cy | CO formation |
| 4 | $Cr_2O_3 \cdot V_2O_5 \cdot WO_3 \cdot TS\text{-}1$ | 91.0 | 0 | 99.3 | 0 | >99.8 | 0 | >99.8 | 0 |
| 5 | $MnO_2 \cdot V_2O_5 \cdot WO_3 \cdot TS\text{-}1$ | 92.0 | 0 | 99.5 | 0 | >99.8 | 0 | >99.8 | 0 |
| 6 | $CuO \cdot V_2O_5 \cdot WO_3 \cdot TS\text{-}1$ | 95.0 | 0 | 99.5 | 0 | >99.8 | 0 | >99.8 | 0 |

Example 7

A molding of the same size and composition as that in Example 4 was prepared. The molding was dipped in 3.0 liters of aqueous solution containing 22 g (as Pd) of palladium nitrate. Then the molding was dried at 100° C. and calcined in an air stream at 500° C. for 2 hours. The thus obtained catalyst was found to support Pd in an amount of 0.25 wt %.

The catalyst was cut into small pieces, each measuring 23 mm square (6×6 cells) and 300 mm long. They were charged into the reactor, through which nitrogen monoxide, carbon monoxide, dichlorobenzene, and $SO_2$-containing gas were passed simultaneously for decomposition under the following conditions. (The gas mixture contains $NH_3$ as a reducing agent.)

1. Gas composition
   Dichlorobenzene . . . 30 ppm v/v
   NO . . . 300 ppm v/v
   $NH_3$ . . . 300 ppm v/v
   CO . . . 1.0 vol %
   $SO_2$ . . . 100 ppm v/v
   $H_2O$ . . . 10 vol %
   Air . . . balance
2. Space velocity . . . 2000 h$^{-}$
3. Reaction temperature . . . 200°, 250° C.

The results are shown in Table 5.

TABLE 5

| | 200° C. | 250° C. |
|---|---|---|
| Decomposition efficiency of dichlorobenzene | >99.0% | >99.0% |
| Denitration efficiency | 96.0% | 90.0% |
| CO removal efficiency | >99.9% | >99.9% |
| $NH_3$ conversion | >99.5% | >99.5% |
| $SO_2$ conversion | <1.0% | <1.0% |
| $Cl_2$ formation | 0 | 0 |

Example 8

In 500 liters of water was dissolved 19.3 kg of zirconium oxychloride ($ZrOCl_2 \cdot 8H_2O$), and the resulting solution was thoroughly mixed with 78 liters of the aqueous solution of titanyl sulfate of the same composition as used in Example 1. To the mixture of the solutions, kept at about 30° C., was slowly added dropwise with stirring ammonia water until the pH was 7. The solution was allowed to stand for 15 hours to effect precipitation. The precipitates (gel) were filtered off, washed with water, dried at 200° C. for 10 hours, and finally calcined in an air stream at 550° C. for 5 hours. Thus there was obtained a composite oxide of titanium-zirconium. This composite oxide was found to have a composition of Ti: Zr=4:1 (atomic Patio) and a BET specific surface area of 140 m$^2$/g. This composite oxide powder is designated as TZ-1 hereinafter. TZ-1 was made into a molding of the composition TZ-1: $V_2O_5$: $WO_3$=90: 5:5 (by weight) in the same manner as in Example 1. This molding is in the-form of honeycomb shaped molding, measuring 80 mm square and 350 mm long, with an opening of 3.0 mm and a wall thickness of 0.7 mm. This molding was dipped in 3 liters of aqueous solution of platinum chloride (containing 11.0 g of Pt) for 1 minute. The dipped molding was dried in air at 120° C. and calcined in an air stream at 450° C. for 2 hours. Thus there was obtained the desired catalyst. The catalyst was found to support Pt in an amount of 0.1 wt %.

This catalyst was tested in the same manner and under the same conditions as in Example 7 for the simultaneous treatment of nitrogen monoxide, carbon monoxide, dichlorobenzene, and $SO_2$-containing gas which were incorporated with $NH_3$ as a reducing agent. The results are shown in Table 6.

TABLE 6

| | 200° C. | 250° C. |
|---|---|---|
| Decomposition efficiency of dichlorobenzene | 98.5% | >99.0% |
| Denitration efficiency | 94.0% | 85.0% |
| CO removal efficiency | >99.9% | >99.9% |
| $NH_3$ conversion | >99.5% | >99.5% |
| $SO_2$ conversion | 5.0% | 10.5% |
| $Cl_2$ formation | 0 | 0 |

Comparative Example 1

A cordierite honeycomb (having 3-mm square holes) was coated with γ-alumina powder, followed by drying and calcining. Pt was supported on the resulting catalyst carrier by the chemical adsorption method, followed by drying at 1000° C. and calcining in an air stream at 450° C. for 2 hours. Thus there was obtained a comparative catalyst, which was found to support Pt in an amount of 0.25 wt %. This comparative catalyst was tested in the same manner and under the same conditions as in Example 1 for the decomposition of 1,1,2,2-tetrachloroethane and dichlorobenzene. The results are shown in Table 7.

TABLE 7

| Comparative Example No. | Object for disposal | Decomposition efficiency and CO formation (%) | | | | | | | | | |
|---|---|---|---|---|---|---|---|---|---|---|---|
| | | 200° C. | | 250° C. | | 300° C. | | 350° C. | | 400° C. | |
| | | Decomp. effi'cy | CO formation | Decomp. effi'cy | CO formation | Decomp. effi'cy | CO formation | Decomp. effi'cy | CO formation | Decomp. effi'cy | CO formation |
| 1-1 | Tetra- | 0 | 0 | 5 | 0 | 70 | 0 | >99.5 | 0 | >99.5 | 0 |

TABLE 7-continued

| Comparative Example No. | Object for disposal | Decomposition efficiency and CO formation (%) | | | | | | | | |
|---|---|---|---|---|---|---|---|---|---|---|
| | | 200° C. | | 250° C. | | 300° C. | | 350° C. | | 400° C. | |
| | | Decomp. effi'cy | CO formation | Decomp. effi'cy | CO formation | Decomp. effi'cy | CO formation | Decomp. effi'cy | CO formation | Decomp. effi'cy | CO formation |
| 1-2 | chloroethane Dichlorobenzene | 18 | 0 | 55 | 0 | >99.8 | 0 | >99.8 | 0 | >99.8 | 0 |

Comparative Example 2

A mixture was made from 10 Kg of commercial $TiO_2$ powder (having a BET specific surface area of 30 m²/g) and 1.5 kg of water. The mixture was extrusion-molded into a honeycomb shaped molding, measuring 80 mm square and 350 mm long, with an opening of 3.0 mm and a wall thickness of 0.7 mm. The molding was dried at 60° C. and, then calcined in an air stream at 450° C. for 5 hours. The thus obtained molding was dipped in 3 liters of aqueous solution of platinum chloride (containing 14 g of Pt) for 1 minute, followed by drying at 100° C. and calcining in an air stream at 450° C. for 5 hour. Thus there was obtained a catalyst which was found to support Pt in an amount of 0.12 wt %. This catalyst was cut into small pieces of the same size as in Example 1. They were tested under the same condition as in Example 1 for the decomposition of 1,1,2,2-tetrachloroethane and dichlorobenzene. The results are shown in Table 8.

TABLE 8

| Comparative Example No. | Object for disposal | Decomposition efficiency and CO formation (%) | | | | | | | | |
|---|---|---|---|---|---|---|---|---|---|---|
| | | 200° C. | | 250° C. | | 300° C. | | 350° C. | | 400° C. | |
| | | Decomp. effi'cy | CO formation | Decomp. effi'cy | CO formation | Decomp. effi'cy | CO formation | Decomp. effi'cy | CO formation | Decomp. effi'cy | CO formation |
| 2-1 | Tetrachloroethane | 0 | 0 | 20 | 0 | 85 | 0 | >99.5 | 0 | >99.5 | 0 |
| 2-2 | Dichlorobenzene | 35 | 0 | 80 | 0 | >99.8 | 0 | >99.8 | 0 | >99.8 | 0 |

Comparative Example 3

Ammonium paratungstate (1.03 kg) and ammonium metavanadate (1.14 kg) were dissolved in succession in a mixture of 0.7 liter of monoethanolamine and 7 liters of water. The resulting solution was thoroughly mixed with 16 kg of the same $TiO_2$ powder as used in Comparative Example 2 and an adequate amount of water. The resulting mixture was extrusion-molded into a honeycomb shaped molding, measuring 80 mm square and 350 mm long, with an opening of 3.0 mm and a wall thickness of 0.7 min. The molding was dried at 60° C. and then calcined under an air stream at 450° C. for 5 hours. Thus there was obtained a catalyst composed of $TiO_2$: $V_2O_5$: $WO_3$=90: 5:5 (by weight). The thus obtained molding was dipped in 3 liters of aqueous solution of platinum chloride (containing 45 g of Pt) for 1 minute, followed by drying at 100° C. and calcining in an air stream at 450° C. for 5 hour. Thus there was obtained a catalyst which was found to support Pt in an amount of 0.31 wt %. This catalyst was tested in the same manner and under the same condition as in Example 7 for the simultaneous treatment of nitrogen monoxide, carbon monoxide, dichlorobenzene, and $SO_2$-containing gas which were incorporated with $NH_3$ as a reducing agent. The results are shown in Table 9.

TABLE 9

| | 200° C. | 250° C. |
|---|---|---|
| Decomposition efficiency of dichlorobenzene | 80.0% | 95.0% |
| Denitration efficiency | 90.0% | 80.0% |
| CO removal efficiency | >99.9% | >99.9% |
| $NH_3$ conversion | >99.5% | >99.5% |
| $SO_2$ conversion | 12.0% | 20.0% |
| $Cl_2$ formation | 2.0% | 5.0% |

Effect of the Invention

As mentioned above, the present invention provides a method for efficiently disposing, by oxidative decomposition at low temperatures, of organohalogen compounds contained in waste gas, without forming carbon monoxide and halogen gas. Thus the method permits the simultaneous removal of organohalogen compounds together with nitrogen oxide and carbon monoxide from waste gas.

We claim:

1. A method for disposing of organohalogen compounds and carbon monoxide contained in waste gas by oxidative decomposition in the presence of oxygen to make them harmless, said method consisting essentially of catalytically reacting waste gas at a temperature between 150°–600° C. with a catalyst consisting essentially of
   as catalyst component A a composite oxide of two or more metals selected from the group consisting of Si, Ti, and Zr;
   as catalyst component B an oxide of one or more metals selected from the group consisting of V, Mo, Sn, Ce, and W; and
   as catalyst component C, in the form of simple substance or oxide, one or more metals selected from the group consisting of Ru, Rh, Pd and Pt.

2. A method for disposing of organohalogen compounds and carbon monoxide by oxidative decomposition in the presence of oxygen as defined in claim 1, wherein ammonia is incorporated into said waste gas to facilitate the removal of nitrogen oxide contained in said waste gas.

3. A method of disposing of organohalogen compounds and carbon monoxide by oxidative decomposition in the presence of oxygen as defined in claim 1, wherein component A is present in an amount of 70 to 95% by weight, component B is present in an amount of 0.1 to 20% by weight and component C is present in an amount of 0.01 to 25% by weight.

* * * * *